United States Patent [19]

Yaghmaie et al.

[11] Patent Number: 4,623,359

[45] Date of Patent: Nov. 18, 1986

[54] AQUEOUS SLURRIES OF SOLID CARBONACEOUS FUEL

[75] Inventors: Farrokh Yaghmaie, Wappingers Falls; Stephen R. Vasconcellos, Fishkill; Ronald J. McKeon, Beacon, all of N.Y.

[73] Assignee: Texaco Inc., White Plains, N.Y.

[21] Appl. No.: 642,313

[22] Filed: Aug. 20, 1984

[51] Int. Cl.$^4$ .............................................. C10L 1/32
[52] U.S. Cl. ........................................ 44/51; 208/428; 260/505 C
[58] Field of Search ................... 44/51; 208/8 LE, 10; 260/505 C

[56] References Cited

U.S. PATENT DOCUMENTS

| | | | |
|---|---|---|---|
| 1,444,665 | 2/1923 | Crommett | 44/51 |
| 2,242,822 | 5/1941 | Fuchs | 44/51 |
| 2,397,859 | 4/1946 | Hersberger et al. | 44/51 |
| 3,224,849 | 12/1965 | Dille et al. | 241/5 |
| 3,544,291 | 4/1968 | Schlinger et al. | 48/200 |
| 3,607,156 | 9/1971 | Schlinger et al. | 48/206 |
| 3,764,547 | 10/1973 | Schlinger et al. | 44/51 |
| 3,835,183 | 9/1974 | Carpenter et al. | 260/505 C |
| 4,104,035 | 8/1978 | Cole et al. | 406/197 |
| 4,192,653 | 3/1980 | Giannetti et al. | 44/51 |
| 4,282,006 | 8/1981 | Funk | 44/51 |
| 4,330,301 | 5/1982 | Yamamura et al. | 44/51 |
| 4,470,828 | 9/1984 | Yamamura et al. | 44/51 |

*Primary Examiner*—William R. Dixon, Jr.
*Assistant Examiner*—Margaret B. Medley
*Attorney, Agent, or Firm*—Robert A. Kulason; James J. O'Loughlin; Albert Brent

[57] ABSTRACT

Aqueous slurries of solid carbonaceous fuel that include a novel highly converted sulfonated surfactant derived from a suspension of low rank coal and coal derived creosote oil for reducing the viscosity and increasing the solids content of the aqueous slurry.

19 Claims, No Drawings

AQUEOUS SLURRIES OF SOLID CARBONACEOUS FUEL

BACKGROUND OF THE INVENTION

1. Field of the Invention

This invention relates to aqueous slurries of solid carbonaceous fuel. More particularly, the present invention relates to a novel highly converted sulfonated water-soluble surfactant derived from a suspension of low rank coal and coal derived creosote oil, its method of production, and its use in aqueous slurries of solid carbonaceous fuel to reduce viscosity and increase solids content, thereby improving pumpability.

Performance of a Texaco entrained flow partial oxidation gas generator may be affected by the nature of the aqueous slurry feedstock. For example, particle size of the solid carbonaceous fuel and solids content of the aqueous slurry influence the viscosity and pumpability of the slurry. A finer grind size may produce a higher carbon conversion for the same oxidant feedrate. However, the finer the grind size, the higher the grinding cost due to greater expenditures for equipment and electric power. Also, the finer the grind size, the greater the viscosity for slurries having the same solids content. Pumping costs go up as the viscosity of the slurry increases. Further, the efficiency of the partial oxidation process decreases when the solids content of the slurry drops off and excessive water is present.

By means of the subject invention, aqueous slurries of solid carbonaceous fuel may be prepared having a higher solids content and reduced viscosity, at a great economic benefit.

Slurries of solid fuel and water suitable for use as feed to a partial oxidation zone are described in coassigned U.S. Pat. Nos. 3,224,849; 3,544,291; 3,607,156; and 4,104,035. Dispersing agents for pipeline pumpable coal-water slurries are described in U.S. Pat. No. 4,282,006.

SUMMARY OF THE INVENTION

According to this invention there is provided a solid carbonaceous fuel-water slurry having a high solids content and improved pumpability which comprises:
(1) about 50 to 70 weight % of comminuted solid carbonaceous fuel;
(2) about 0.5 to 8.0 weight % of a water-soluble surfactant derived from a suspension of low rank coal and coal derived creosote oil which is prepared as follows:
  (a) mixing comminuted low rank coal feed with coal-derived creosote oil to produce a suspension having a solids content of about 20 to 60 weight %;
  (b) sulfonating the suspension of low rank coal and coal-derived creosote oil from (a) at a temperature in the range of about 100° to 125° C. until at least about 85 weight % of the suspension of low rank coal and coal-derived creosote oil is converted; and
  (c) cooling the sulfonated mixture from (b) to room temperature and neutralizing to a pH in the range of about 6.5–7.5 to produce said surfactant; and
(3) water, comprising the remainder of said solid carbonaceous fuel-water slurry.

The yield of the surfactant derived from a suspension of low rank coal and coal-derived creosote oil in (2) may be increased by pretreating the low rank coal prior to sulphonation with hydrogen peroxide thereby increasing its combined oxygen content in the following manner:
  (i) mixing comminuted low rank coal with water to produce an aqueous slurry having a solids content in the range of about 25 to 50 weight %;
  (ii) oxidizing the low rank coal in the aqueous slurry from (i) to increase its combined oxygen content at least 5.0 weight %; and
  (iii) separating water from the oxidized low rank coal.

DISCLOSURE OF THE INVENTION

The subject invention deals with pumpable slurries of solid carbonaceous fuel and water having a high solids content e.g. about 50 to 70 weight percent (we. %), such as about 55–65 wt. %. Included in the slurry mixture is about 0.5 to 8.0 wt. %, such as about 1.0 to 3.0 wt. % of a novel surfactant comprising a highly converted sulfonated water-soluble surfactant derived from a suspension of low rank coal and coal-derived creosote oil. The use of this surfactant allows the solids content of the slurry to be substantially increased with only a relatively small change in viscosity.

The term solid carbonaceous fuel, as used herein to describe suitable solid carbonaceous feedstocks, is intended to include various materials and mixtures thereof from the group consisting of coal, coke from coal, char from coal, petroleum coke, particulate carbon soot, oil shale, tar sands, pitch, and mixtures thereof. All types of coal may be used including anthracite, bituminous, and lignite. The particulate carbon may be that which is obtained as a by-product of the subject partial oxidation process (to be further described), or that which is obtained by burning fossil fuels. The term solid carbonaceous fuel also includes by definitions semi-solid organic materials such as asphalt, rubber and rubber-like materials including rubber automobile tires which may be ground or pulverized to the proper particle size.

The moisture content of the solid carbonaceous fuel particles is in the range of about 0 to 25 wt. %, such as about 0.5 to 10 wt. %. Predrying may be required in some instances to reach these levels. Any suitable grinding system may be used to convert the solid carbonaceous fuels or mixtures thereof to the proper size.

The solid carbonaceous fuels are preferably ground to a particle size so that 100% of the material passes through an ASTM E11 420 $\mu$m (Alternative No. 40) e.g. 35 mesh sieve and at least 80% passes through an ASTM E11 Sieve Designation Standard 37 $\mu$m (Alternative No. 400) e.g. 400 mesh sieve 1000 $\mu$m=1 mm.

The novel sulfonation product of a slurry comprising low rank coal and coal-derived creosote oil which is used as the additive in the solid carbonaceous fuel-water slurries of our invention may be characterized as a surfactant. Surfactant materials provide surface activity and alter energy relationships at the interface of the solid fuel particles. By the subject process, low cost low rank coal may be converted into an effective inexpensive viscosity reducing surfactant. The process involves no separation of the side products. Further purification is not necessary to enhance its effectiveness. Thus, all side products can remain within the system and have no deleterious effect on the activity of the surfactant.

The major organic compounds in coal are condensed polynuclear carbocyclic and heterocyclic ring compounds containing carbon, hydrogen, oxygen, nitrogen and sulfur. The amount of carbon in aromatic ring structures increases and the amount of oxygen decreases with increasing rank.

The classification of coals by rank is provided in ASTM D 388. The higher rank coals are classified according to fixed carbon on the dry basis; and the lower rank coals are classified according to calorific value on the moist basis. By definition, the term "low rank" coal as used herein means coals having calorific values less than 14,000 BTU/lb on the moist, mineral-matter-free basis; and with a fixed carbon on the dry, mineral-matter-free basis of less than 69%. The total oxygen content of low rank coals may vary in the range of about 5.0 wt. % (dry, mineral matter free basis) for bituminous coals to 35.0 wt. %, or more for lignite. The comparatively large number of oxygen containing functional groups in the low rank coal starting material plus the 5.0 wt. %, or more of oxygen which may be optionally added to the low rank coal during the optional oxidizing treatment of the aqueous slurry of low rank coal are required for our process. It was unexpectedly found that the greater the amount of combined oxygen in the low rank coal, the greater is the conversion in the sulphonation step. Accordingly, high rank coals e.g. anthracite and some types of bituminous coals, containing about 4.0 wt. % of combined oxygen, or below will not produce the high yields attained by the low rank coal and are therefore unsuitable for use in the subject process. Suitable low rank coals are shown in Table I of ASTM D 388 and are designated Class II Bituminous Groups 4 and 5; Class III Subbituminous Groups 1, 2 and 3; Class IV Lignitic Groups 1 and 2; and mixtures thereof.

The novel improved surfactant derived from a suspension of low rank coal and coal-derived creosote oil of this invention may be prepared by the following process:
(a) mixing comminuted low rank coal with coal-derived creosote oil to produce a suspension having a solids content in the range of about 20 to 60 weight %;
(b) sulfonating the suspension of low rank coal and coal-derived creosote oil from (a) at a temperature in the range of about 100° to 125° C. until at least about 85 weight % of the low rank coal and coal-derived creosote oil are converted; and
(c) cooling the sulfonated mixture from (b) to room temperature and neutralizing to a pH in the range of about 6.5 to 7.5, such as about 7.0 to produce said surfactant.

The comminuted low rank coal feed in (a) above has a particle size of less than ASTM E-11 Alternate Sieve Designation No. 16 e.g. 1190 microns.

When the low rank coal feed was pretreated with an oxidizing agent, it was unexpectedly found that yields were increased during subsequent sulfonation. The low rank coal is preferable oxidized while in an aqueous slurry having a solids content in the range of about 25 to 50 wt. %. The preferable water soluble oxidizing agent for oxidizing the low rank coal is hydrogen peroxide. Aqueous solutions of hydrogen peroxide comprising 28.5 to 70 wt. % $H_2O_2$ are suitable. Other suitable water soluble oxidizing agents include potassium permanganate, potassium dichromate, peroxyformic acid and calcium hypochlorite. Increasing the total combined oxygen content of the low rank coal is optional. Thus, the total combined oxygen content of the low rank coal may be increased by at least 5 wt. %, e.g. from a value in the range of about 5.0 to 35.0 wt. %, or more (dry, mineral matter free basis) to a value in the range of about 10.0 to 65.0 wt. % (dry mineral matter free basis). Thus, for example, for each 100 gr. of coal, about 10–20 ml, such as 15 ml of 20–40 volume percent of hydrogen peroxide is added gradually to the aqueous slurry. The slurry is stirred for about 5–20 minutes, such as about 10 minutes. Excess peroxide is then destroyed for example, by adding a small amount of ferrous sulfate, e.g. about 0.5–1.0 wt. %. Water is then removed by conventional means such as by evaporation or distillation.

In the preparation of the subject novel low rank coal derived surfactant, the comminuted low rank coal feed is mixed with the coal derived creosote oil to produce a suspension having a solids content in the range of about 20 to 60 wt. % such as about 30 to 50 wt. %. The suspension may be heated to a temperature in the range of about 100° to 125° C. The comminuted low rank coal may or may not have been oxidized in the manner previously described. The coal derived creosote oil is a dark yellow to greenish oil obtained from coal-tar distillation. Coal-tar is obtained by the conventional pyrolysis or carbonization of coal. Coal derived creosote oil has a specific gravity in the range of about 1.030–1.080 and an atmospheric boiling point in the range of about 200°–300° C. such as about 200° to 260° C.

A typical analysis of coal derived creosote oil showing the more important constituents follows:

|  | wt. % |
| --- | --- |
| phenanthene | 23.9 |
| 1-naphthonitrile | 13.2 |
| naphthalene and substituted naphthalene | 9.4 |
| dibenzofuran | 8.6 |
| acenaphthene | 7.7 |
| fluoranthene | 7.1 |
| anthracene | 5.5 |
| pyrene | 3.3 |
| 4,5-methylenephenanthrene | 3.2 |
| 9,10-dihydroanthracene | 3.1 |

Advantageously, at least 85 wt. % or more, such as about 90 wt. % of the low rank coal may be sulfonated by the subject process. Also, as previously noted, it was unexpectedly found that the yield of sulfonated surfactant may be increased further, e.g., about 5.0–10.0 wt. % by oxidizing the comminuted low rank coal prior to the sulfonating step. Chlorinated hydrocarbons or long chain aliphatic hydrocarbons were found not to be conducive to the sulfonation of coal. Sulfonation in the presence of these solvents yielded very low conversions. Direct sulfonation was also found unsuitable owing in part to the macromolecular structure of the coal.

Sulfonation of the low rank coal may take place by heating the coal and coal derived creosote oil at a temperature in the range of about 100° to 125° C., such as about 110° to 120° C. for a period of about 15–60 minutes. During this period, creosote oil not only suspends the coal but also diffuses into pores and capillaries known to exist in coal particles. A sulfonating agent is then gradually admitted to the system while the mixture is stirred. From about 100 to 140 weight percent of the theoretical quantity of sulfonating agent may be employed. A suitable sulfonating agent may be selected from the group consisting of sulfuric acid of 93 to 98% strength, oleum (100 percent sulfuric acid containing 20% to 50% dissolved sulfur trioxide), and sulfur trioxide. For example, the sulfonating agent may comprise about 50 to 300 parts by weight of sulfuric acid or oleum. Optionally, water may be removed during sulfonation by aspiration. After being cooled to room temperature, the sulfonated mixture is neutralized. Sodium bicarbonate, sodium hydroxide, ammonium hydroxide or potassium hydroxide may be used to adjust the pH of the mixture to a value in the range of about 6.5–7.5. Without further modification, the resulting water-soluble surfactant solution can be used for applications requiring a viscosity reducing additive.

Advantageously, the subject coal-water slurries may be made from both coarse and fine solid carbonaceous fuels. Further, the novel and effective water-soluble surfactant that is incorporated in said slurries is prepared from inexpensive low-rank coal and coal-derived creosote oil. There is no need for purification of the surfactant, which becomes part of the feedstock to the partial oxidation gas generator.

The following examples illustrate the subject invention and should not be construed as limiting the scope of the invention.

EXAMPLE I

Coal-water slurries having a solids concentration of about 58 wt.% were prepared from Illinois #6 coal having a particle size of ASTM E-11 Sieve Designation Alternate No. 60 (250 micron). A water soluble surfactant was prepared in accordance with the subject invention by sulfonating a suspension of low rank coal ASTM D388 Table I Class II Bituminous Group 4 and coal-derived creosote oil to a conversion of at least 85% in the manner described previously and neutralized to a pH of 7.0. In other examples, prior to sulfonation, the low rank coal was oxidized in the manner described previously. The apparent viscosity of the coal-water slurry with no surfactant and also with the subject surfactant added in the amount of 5.0% by weight of the solids is shown in Table I at various shear rates. The data clearly shows that the subject surfactant is very effective for the reduction of coal-water slurry viscosities; and especially at low shear rates. Further, the surfactant will maintain the viscosity of the coal-water slurry substantially constant over a wide range of shear rates.

TABLE I

| | APPARENT VISCOSITY (poises) | |
|---|---|---|
| Shear Rate (sec$^{-1}$) | No Surfactant | 5% Surfactant (Basis Wt. of Solids) |
| 5.10 | 60 | 8 |
| 10.2 | 30 | 8 |
| 170 | 9 | 7.5 |
| 340 | 8 | 7.3 |

EXAMPLE II

The effect of solids concentration on the apparent viscosity of coal-water slurries, as prepared in the manner described previously, is shown in Table II. The data clearly shows that the subject surfactant is very effective for the reduction of coal-water slurry viscosities. Further, the surfactant will maintain the viscosity of the coal-water slurry below the maximum pumpable viscosity even though the present solids concentration in the slurry is increased.

TABLE II

| | APPARENT VISCOSITY (poises) | |
|---|---|---|
| Wt. % Solids | No Surfactant Max. Pumpable | 5% Surfactant (Basis Wt. of Solids) |
| 57 | 44 | 4 |
| 59 | 46 | 8 |
| 61 | 47 | 14 |
| 63 | 53 | 28.5 |

Other modifications and variations of the invention as hereinbefore set forth may be made without departing from the spirit and scope thereof, and therefore only such limitations should be imposed on the invention as are indicated in the appended claims.

We claim:

1. A solid carbonaceous fuel-water slurry which comprises:
   (1) about 50 to 70 weight % of comminuted solid carbonaceous fuel;
   (2) about 0.5 to 8.0 weight % of a water-soluble surfactant derived from a suspension of low rank coal and coal derived creosote oil which is prepared as follows:
      (a) mixing comminuted low rank coal feed having a combined oxygen content in the range of about 5.0 to 35.0 weight %, or more and a particle size of less than 1180 microns with coal-derived creosote oil having a specific gravity in the range of about 1.030–1.080 and having an atmospheric boiling point in the range of about 200°–300° C. to produce a suspension having a solids content of about 20 to 60 weight %;
      (b) sulfonating the suspension of low rank coal and coal-derived creosote oil from (a) at a temperature in the range of about 100° to 125° C. until at least about 85 weight % of the suspension of low rank coal and coal-derived creosote oil is converted; and
      (c) cooling the sulfonated mixture from (b) to room temperature and neutralizing to a pH in the range of about 6.5–7.5 to produce said surfactant; and
   (3) water, comprising the remainder of said solid carbonaceous fuel-water slurry.

2. The solid carbonaceous fuel-water slurry of claim 1 wherein said solid carbonaceous fuel is selected from the group consisting of coal, coke from coal, char from coal, petroleum coke, particulate carbon soot, oil shale, tar sands, pitch, and mixtures thereof.

3. The solid carbonaceous fuel-water slurry of claim 1 wherein said comminuted solid carbonaceous fuel has a particle size so that 100% of the material passes through a 35 mesh sieve and at least 80% passes through a 400 mesh sieve (Alternative No. 400);

4. The solid carbonaceous fuel-water slurry of claim 1 wherein said low rank coal is selected from the group consisting of ASTM D 388 Table I Class II Bituminous Groups 4 and 5; Class III Subbituminous Groups 1, 2 and 3; Class IV Lignite Groups 1 and 2; and mixtures thereof.

5. The solid carbonaceous fuel-water slurry of claim 1 where in step (2) (b) said sulfonating treatment is effected by gradually stirring into said suspension of comminuted low rank coal and coal derived creosote oil from 2 (a) about 100 to 140 weight percent of the theoretical quantity of a conventional sulfonating agent.

6. The solid carbonaceous fuel-water slurry of claim 5 wherein said sulfonating agent is selected from the group consisting of sulfuric acid of 93 to 98% strength, oleum 100 percent sulfuric acid containing 20% to 50% dissolved sulfur trioxide, and sulfur trioxide alone.

7. The solid carbonaceous fuel-water slurry of claim 6 wherein said sulfonating agent comprises about 50 to 300 parts by weight of sulfuric acid or oleum.

8. The solid carbonaceous fuel-water slurry of claim 1 where in (2) (b) water is removed during the sulfonation reaction.

9. The solid carbonaceous fuel-water slurry of claim 1 wherein said low rank coal feed is subjected to the following oxidizing treatment prior to step (2) (a) thereby increasing its combined oxygen content;
 (i) mixing comminuted low rank coal with water to produce an aqueous slurry having a solids content in the range of about 25 to 50 weight percent;
 (ii) oxidizing the low rank coal in the aqueous slurry from (i) to increase its combined oxygen content at least 5.0 weight percent; and
 (iii) separating water from the oxidized low rank coal from (ii).

10. The solid carbonaceous fuel-water slurry of claim 9 wherein the low rank coal in (ii) is oxidized by the steps of gradually stirring into said aqueous slurry from about 10–20 ml of 20–40 volume % hydrogen peroxide for each 100 gr. of low rank coal, and then destroying any excess peroxide.

11. The solid carbonaceous fuel-water slurry of claim 10 wherein any excess hydrogen peroxide is destroyed by adding about 0.5–5 weight % of ferrous sulfate, and the water is separated in (iii) by evaporation or distillation.

12. A process for producing a solid carbonaceous fuel-water slurry comprising:
 mixing together about 50–70 weight % comminuted solid carbonaceous fuel, about 0.5 to 8.0 weight % of a water-soluble surfactant derived from a suspension of low rank coal and coal derived creosote oil, and water comprising the remainder of said solid carbonaceous fuel-water slurry; wherein said surfactant is prepared as follows:
 (a) mixing comminuted low rank coal feed having a combined oxygen content in the range of about 5.0 to 35.0 weight %, or more and a particle size of less than 1180 microns with coal-derived creosote oil having a specific gravity in the range of about 1.030–1.080 and having an atmospheric boiling point in the range of about 200°–300° C. to produce a suspension having a solids content of about 20 to 60 weight %;
 (b) sulfonating the suspension of low rank coal and coal-derived creosote oil from (a) at a temperature in the range of about 100° to 125° until at least about 85 weight % of the low rank coal and coal-derived creosote oil are converted; and
 (c) cooling the sulfonated mixture from (b) to room temperature and neutralizing to a pH of about 6.5–7.5 to produce said surfactant.

13. The process of claim 12 wherein said solid carbonaceous fuel is selected from the group consisting of coal, coke from coal, char from coal, petroleum coke, particulate carbon soot, oil shale, tar sands, pitch, and mixtures thereof; and said low rank coal is selected from the group consisting of ASTM D 388 Table 1. Class II Bituminous Groups 4 and 5; Class III Subbituminous Groups 1, 2 and 3; Class IV Lignite Groups 1 and 2; and mixtures thereof.

14. The process of claim 12 wherein said solid carbonaceous fuel has a particle size so that 100% of the material passes through a 35 mesh sieve and at least 80% passes through a 400 mesh sieve.

15. The process of claim 12 wherein in (b) said sulfonating treatment is effected by gradually stirring into said suspension of comminuted low rank coal and coal derived creosote oil from (a) about 100 to 140 weight % of the theoretical quantity of a sulfonating agent selected from the group consisting of sulfuric acid of 93 to98% strength, oleum (100% sulfuric acid containing 20 to 50% dissolved sulfur trioxide), and sulfur trioxide alone.

16. The process of claim 12 where in step (b) water is removed during the sulfonating reaction.

17. The process of claim 12 wherein said low rank coal feed is subjected to the following oxidizing treatment prior to (a) thereby increasing its combined oxygen content:
 (i) mixing comminuted low rank coal with water to produce an aqueous slurry having a solids content in the range of about 25 to 50 weight %;
 (ii) oxidizing the low rank coal in the aqueous slurry from (i) to increase its combined oxygen content at least 5.0 weight %; and
 (iii) separating water from the oxidized low rank coal.

18. The process of claim 17 wherein the low rank coal in (ii) is oxidized by the steps of gradually stirring into said aqueous slurry from about 10–20 ml of 20–40 volume % hydrogen peroxide for each 100 gr. of low rank coal, and then destroying any excess peroxide.

19. A process for producing a coal-water slurry feedstock to a partial oxidation gas generator comprising:
 mixing together about 50–70 weight % of comminuted coal having a particle size so that 100% of the material passes through a 35 mesh sieve and at least 80% passes through a 400 mesh sieve, about 0.5 to 8.0 weight % of a water-soluble surfactant derived from a suspension of comminuted low rank coal and coal derived creosote oil, and water comprising the remainder of said coal-water slurry; wherein said surfactant is prepared by the process of:
 (i) mixing comminuted low rank coal having a combined oxygen content in the range of about 5.0 to 35.0 weight %, or more and a particle size of less than 1190 microns with water to produce an aqueous slurry having a solids content in the range of about 25 to 50 weight %;
 (ii) oxidizing the low rank coal in the aqueous slurry from (i) to increase its combined oxygen content by at least 5.0 weight % by gradually stirring into said aqueous slurry from about 10–20 ml of 20–40 volume % hydrogen peroxide for each 100 gr. of low rank coal, and then destroying any excess peroxide;
 (iii) separating water from the oxidized low rank coal;
 (iv) mixing the oxidized low rank coal from (iii) with coal-derived creosote oil having a specific gravity in the range of about 1.030–1.080 and having an atmospheric boiling point in the range of about 200°–300° C. to produce a suspension having a solids content of about 20 to 60 weight %;
 (v) sulfonating the suspension from (iv) at a temperature in the range of about 100° to 125° C. until at least about 85 weight % of the oxidized low rank coal and coal-derived creosote oil are converted; and
 (vi) cooling the sulfonated mixture from (v) to room temperature and neutralizing to a pH of about 6.5–7.5 to produce said surfactant.

* * * * *